United States Patent [19]

Tanaka et al.

[11] Patent Number: 5,389,412
[45] Date of Patent: Feb. 14, 1995

[54] THERMOPLASTIC POLYIMIDE TUBULAR FILM

[75] Inventors: Akihiro Tanaka, Kusatsu; Tatsuro Kitaura, Shiga; Junya Kanetake, Moriyama; Tsutomu Yoshida, Kusatsu; Satoru Wakinaka, Konan, all of Japan

[73] Assignee: Gunze Limited, Ayabe, Japan

[21] Appl. No.: 232,312

[22] Filed: Apr. 25, 1994

Related U.S. Application Data

[63] Continuation of Ser. No. 960,644, Oct. 14, 1992, abandoned.

[51] Int. Cl.$^6$ .................. B29C 47/20; B29C 55/22; B32B 1/08; C08J 5/18
[52] U.S. Cl. ................ 428/35.5; 264/209.1; 264/209.5
[58] Field of Search .............. 428/35.5; 264/209.1, 264/209.5

[56] References Cited

U.S. PATENT DOCUMENTS

| | | | |
|---|---|---|---|
| 4,238,538 | 12/1980 | Manwiller | 428/36 |
| 4,378,324 | 3/1983 | Makino et al. | 264/41 |
| 4,874,648 | 10/1989 | Hill et al. | 428/36.91 |
| 4,968,367 | 11/1990 | Diderich et al. | 156/182 |
| 5,021,036 | 6/1991 | Tanaka et al. | 474/237 |
| 5,049,276 | 9/1991 | Sasaki | 210/500.23 |
| 5,068,068 | 11/1991 | Furusawa et al. | 264/23 |
| 5,070,181 | 12/1991 | Kawai et al. | 428/473.5 |
| 5,075,036 | 12/1991 | Parish et al. | 428/473.5 |

FOREIGN PATENT DOCUMENTS

| | | |
|---|---|---|
| 110519 | 5/1986 | Japan . |
| 178415 | 7/1989 | Japan . |
| 106616 | 5/1991 | Japan . |
| 93210 | 3/1992 | Japan . |
| 4-93210 | 3/1992 | Japan . |
| 197622 | 7/1992 | Japan . |
| 278327 | 10/1992 | Japan . |

*Primary Examiner*—James C. Cannon
*Attorney, Agent, or Firm*—Armstrong, Westerman, Hattori, McLeland & Naughton

[57] ABSTRACT

A tubular thermoplastic polyimide film manufactured by melt-extruding a novel kind of thermoplastic polyimide resin is provided. This film has a remarkably high dimensional accuracy, inclusive of the accuracy of film thickness, and is suitable for use in a variety of applications such as printer fixation belts.

4 Claims, No Drawings

THERMOPLASTIC POLYIMIDE TUBULAR FILM

This application is a continuation of application Ser. No. 07/960,644 filed Oct. 14, 1992, now abandoned.

The present invention relates to a tubular thermoplastic polyimide film.

BACKGROUND OF THE INVENTION

Heretofore, polyimide films have been used in a variety of applications where heat resistance is an important requirement. The polyimide film is usually manufactured by casting a solution of a polyamic acid, which is a precursor of the polyimide, and treating the resulting film for solvent removal and dehydration for cyclization reaction.

However, the casting method involving the use of a solvent not only presents the environmental problems of pollutions and health hazard but is low in productivity, with the consequent high cost of production.

An object of the present invention is to provide a tubular thermoplastic polyimide film manufactured by the melt-extrusion of a molding compound composed predominantly of a thermoplastic polyimide resin.

An another object of the present invention is to provide a tubular thermoplastic polyimide film with improved dimensional accuracy, inclusive of the accuracy of film thickness.

Other objects and features of the invention will become apparent from the description of the invention which follows.

SUMMARY AND DETAILED DESCRIPTION OF THE INVENTION

The tubular thermoplastic polyimide film of the present invention is predominantly composed of a thermoplastic polyimide resin and manufactured by the melt-extrusion technique.

The thermoplastic polyimide resin to be employed in the present invention is different from the conventional thermosetting and non-thermosetting polyimide resins. Typically it has a melt viscosity of about 1000 to about 4000 poises as determined with a KOUKA type flow tester (die size 10 mm×0.1 mm, preheating time 5 min.) at a near-melting temperature of 380°–420° C. Because the tubular film of the invention is manufactured by extrusion-molding such a thermoplastic polyimide resin with a low melt viscosity, not only is the manufacturing process rendered expedient but the resulting film has remarkably high dimensional accuracy, inclusive of the accuracy of film thickness. Thermoplastic polyimide resins outside of the above range of melt viscosity can also be employed but the resulting film tends to be less satisfactory in dimensional accuracy and the extrusion is often not as easy. However, depending on the intended use, such thermoplastic polyimide resins can also be employed.

The thermoplastic polyimide resin mentioned above may be extruded alone. However, for the purpose of improving the thermal conductivity of the product film or imparting electrical conductivity thereto, an inorganic filler may be added to the thermoplastic polyimide resin compound. The inorganic filler can be liberally selected from among the known fillers, such as conductive carbon, talc, titanate whisker, boron nitride and so on. While the amount of the inorganic filler is not critical and can be selected according to the intended use, it is generally not more than 20% by weight and preferably about 5 to 15% by weight relative to the combined weight of the thermoplastic polyimide resin and inorganic filler.

Furthermore, in the present invention, a variety of other additives such as the stabilizer, lubricant, surfactant, pigment, and thermoplastic resins other than the polyimide resin can be added to the thermoplastic polyimide resin.

In the present insertion, the thermoplastic polyimide resin compound is fed to an extruding machine preferably after drying to a water content of not more than 30 ppm. If the water content is over 30 ppm, the polyimide resin will be liable to decompose and may show poor thermoplasticity to produce foams in the film, thus failing to give a dimensionally accurate tubular thermoplastic polyimide film. Of course, only if it is still possible to obtain a film, the extruding machine may be supplied with the resin compound with a water content of more than 30 ppm.

The tubular thermoplastic polyimide film of this invention is generally melt-extruded using an extruding machine equipped with an annular die and is, therefore, a seamless film. The cylinder of the extruding machine may be made of any appropriate material. However, a cylinder of nitrided steel is generally not recommendable, for it may cause contamination of the compound with the metal oxide due to oxidation of nitrided steel, which may adversely affect the desirable properties of the thermoplastic polyimide film. However, a cylinder of nitrided steel may be used depending on the intended use of the film.

The cylinder of the extruding machine for use in the manufacture of the tubular thermoplastic polyimide film of the invention should preferably be internally lined with a special alloy. The lining material for this purpose is not limited only if it inhibits oxidation of the cylinder. As examples of such lining material, there can be mentioned a composition obtainable by dispersing one or more kinds of finely divided powders, such as powders of carbon, manganese, silicon, boron, nickel, cobalt, chromium, tungsten, carbide, etc., uniformly in a corrosion-resistant alloy matrix and, as a typical commercial product, X-Alloy 800 available from Fuji Industry Co., Ltd. can be mentioned. The corrosion-resistant alloy mentioned above is preferably high in hardness and may for example be a nickel-based alloy (specifically a nickel-cobalt-chromium alloy).

The screw of the extruder is preferably a rapid-compression screw and may have an L/D ratio of 24 to 29, although this range is not critical. Generally the screw and die of the extruder are preferably provided with a hard chrome plating or ceramic coating layer but they may not be have such a cladding layer.

In order to prevent entry of gel particles into the film, a gel filter may be disposed, if necessary, in the neighborhood of the cylinder tip or head of the extruding machine. The gel filter need not be an extraordinary one but can be selected liberally from among the filters conventionally known and used. A typical example of the gel filter is one obtainable by interposing a nonwoven laminate consisting of a nonwoven web of fine-gauge metal fiber and a nonwoven web of finer-gauge metal fiber between a protective wire-mesh (e.g. stainless steel) layer and a wire-mesh (e.g. stainless steel) support layer and sintering the assembly into an integral unit and having an overall mesh size of not more than 10 $\mu$ and preferably about 5 $\mu$, although the mesh size is not limited to the above range. As an example of the filter, there may be mentioned a leaf type filter. The metal fiber mentioned above may for example be a corrosion-resistant alloy fiber, a heat-resistant alloy fiber or a stainless steel or other metal fiber.

For manufacture of the tubular thermoplastic polyimide film of the present invention, the extruding machine is furnished with an annular die and a gas such as air is introduced into a tube emerging from the annular die to attain a predetermined diameter (which may be smaller than the extrusion diameter of the die), followed by cooling. Thus, both the inflation process and the deflation process can be selectively employed as desired. The annular die for use is not particularly limited in type but a die of the spiral mandrel type is particularly desirable. As an alternative, it is possible to extrude a flat film through a T die and, then, form it into a tube.

The method of cooling the extruded film is not critical and may be any appropriate method such as the inside mandrel method, the external cooling method and so on, although the method using a vacuum water cooling system is especially advantageous.

The vacuum water cooling system comprises a sizing sleeve in which a reduced pressure is established by a vacuum pump or the like and a cooling water vessel. The internal annular surface of said sizing sleeve, that is the surface which comes into contact with the extruded tube, is made of a material having a highly smooth surface (for example, a mirror-finished metal or a fluororesin) and is provided with minute orifices. Because of these minute orifices, the surface of the sleeve in contact with the tubular film is constantly subjected to a negative pressure, with the result that the outer diameter of the tubular film is critically controlled to a constant value by the internal annular surface of the sleeve. If necessary, the inside annular surface of the sleeve may be supplied with a small quantity of water or the like medium to establish a thin layer (of water or the like) between the annular surface of the sleeve and the tubular film. When the above vacuum water cooling system is employed, the tubular film is cooled with its outer diameter being critically controlled as described above and, at the same time, the surface smoothness and, hence, the dimensional accuracy of the product film are markedly improved.

The cooling water vessel mentioned above is not limited in type and may for example be an ordinary water vessel in which the outer surface of the tubular film is directly exposed to water or an annular vessel equipped with a water jacket and involving no direct contact of the tube with water.

The melt-extrusion conditions for use in the manufacture of the tubular film of the invention are not particularly critical but may be liberally selected. Generally speaking, the temperature setting is about 310 to about 390° C. for the cylinder feed zone, about 360 to about 400° C. for the compression zone, about 370 to about 410° C. for the melting zone, and about 370 to about 410° C. for the annular die. The preferred number of screw spirals is 9 to 15 in the feed zone, 3 to 8 in the compression zone and 5 to 8 in the melting zone. However, the above values are merely typical and not limitative.

For improved mechanical and other strength characteristics at high temperature, the tubular thermoplastic polyimide film of the invention can be subjected to mono-, bi- or multi-axial orientation and, where necessary, further to heat setting for crystallization. The degree of such crystallization is virtually optional but is preferably 10 to 35% for most purposes. When the degree of crystallization is less than 10%, the product film may undergo thermal deformation at high temperatures over 200° C. On the other hand, if the degree of crystallization exceeds 35%, the film may become somewhat brittle to develop cracks under adverse conditions. Of course, films having degrees of crystallization outside the above range may also be utilized in certain applications. Of course, the polyimide tubular film which is not subjected to said orientation and heat setting also falls within the scope of the invention.

The above orientation or drawing can be performed by any suitable method. There is no particular limitation on conditions of orientation. Generally speaking, the drawing temperature may range from about 250° C. to about 350° C. and the draw ratio may range from about 1.1/1 to about 3/1 in the circumferential direction and/or longitudinal direction. If the drawing temperature is below 250° C., a uniform orientation effect may not be obtained, while a drawing temperature over 350° C. may not be rewarded with a sufficient effect of orientation, for example an improvement in strength. If the draw ratio is less than about 1.1/1, the effect of subsequent crystallization may not be sufficient, while the use of a draw ratio in excess of about 3/1 tends to detract from the accuracy of film thickness. Of course, the higher the draw ratio, the greater is the loss of film thickness. However, the above parameter values are merely illustrative and the optimum set of conditions can be selected according to the intended use of the film and other factors.

The heat setting, which is optionally performed, is generally conducted immediately following completion of drawing but it may be performed bypassing the drawing step. The method for heat setting is not limited and the heat setting temperature is also not critical, although a temperature between about 300° and about 350° C. is generally preferred. There are cases in which the setting effect will be inadequate and the dimensional accuracy of the film be adversely affected when the heat setting temperature is below about 300° C. On the other hand, a heat setting temperature over 350° C. tends to sacrifice the mechanical strength of the product film. The heat setting time required is dependent on the temperature used but generally about 10 to 30 minutes. A heat setting time of less than 10 minutes may not result in a sufficient setting effect, while a heat setting time of over 30 minutes tends to lower the accuracy of film thickness. Of course, the above parameter values are only typical and may be increased or decreased as necessary.

The manufacture of the thermoplastic polyimide film in accordance with the present invention is preferably conducted in a clean room so as to prevent contamination of the film with foreign matter. The desirable degree of cleanliness in the clean room in terms of the total count of particles not smaller than 0.1 $\mu$ per cubic foot of air (the same applies hereinafter) is not more than 100,000, and the smaller this number, the higher is the yield of acceptable film that can be expected. Of course, the manufacturing operation may be performed in an ordinary indoor environment, depending on the intended use of the film.

The tubular thermoplastic polyimide film thus obtained is excellent in heat resistance, mechanical characteristics, dimensional stability, accuracy of thickness, inflammability, resistance to friction, abrasion resistance and electrical characteristics and can be used with great advantage in a broad range of applications such as flexible printed circuit (FPC) substrates, insulating films for electrical parts, various belts for electrical or electronic precision devices, speaker voice coil bobbins, seat belts, food trays, medical device parts, optical parts and materials, and so on.

The following examples are intended to describe the invention in further detail and should by no means be construed as defining the scope of the invention.

EXAMPLE 1

A pelletized thermoplastic polyimide resin (Tg 250° C., m.p. 388° C., melt viscosity 2927 poises as measured with KOUKA flow tester at 420° C.) was dried in a shelf dryer at a circulating air temperature of 300° C. for 2 hours for surface crystallization of the pellets and further dehydrated in a dehumidifying hopper-type dryer at 250° C. for 10 hours to reduce the pellet water content to 10 ppm.

The pellets were then fed to the hopper of an extruding machine with concurrent purging with nitrogen gas. The extruding machine had a cylinder internally lined with X-Alloy 800 [manufactured by Fuji Industry Co., Ltd.], and the cylinder temperature was controlled at 360°–390° C. In the extruder, the pellets were melted, passed through a gel filter (mesh size 5 $\mu$) interposed between the cylinder tip and the annular die, and extruded from the die at 390° C. This annular die was 32 mm in outer diameter and 30 mm in inner diameter and had a 1 mm-wide slit. The melt-extruded film was then passed through the sizing sleeve, 24.5 mm in diameter, of a vacuum water cooling system for cooling to give a tubular thermoplastic polyimide film. This film had a thickness of 50 $\mu \pm 5$ $\mu$ and a circumferential length of 75.4±0.5 mm. Generally, the circumferential length of the film is slightly smaller than the theoretical length due to forming shrinkage, among other factors.

The gel filter used above was a filter fabricated by interposing a laminate of a nonwoven web of fine-gauge stainless steel fiber and a nonwoven web of finer-gauge stainless steel fiber between a protective stainless steel wire-mesh layer and a stainless steel wire-mesh support layer and sintering the assembly into an integral unit.

The above tubular film was drawn at 290° C. and a draw ratio of 2/1 in the circumferential direction and 1.2/1 in the longitudinal direction and, then, heat-set at 310° C. for 15 minutes to give a tubular film with a thickness of 20.8±2 $\mu$ and a circumferential length of 150.8±0.2 mm.

Before drawing, the error of film thickness was ±5 $\mu$ and that of circumferential length was ±0.5 mm. After heat setting, the respective values were ±2 $\mu$ and ±0.2 mm. Thus, the accuracy of film thickness and that of circumferential length were both very high. Particularly, drawing and heat setting resulted improvements in dimensional stability.

As the above procedure was carried out in a clean room with a cleanliness degree of 10,000, no foreign matter was detected in the final film.

The film had a degree of crystallization in the neighborhood of about 30% and was suitable for use as a printer fixing belt.

EXAMPLE 2

To 92% by weight of a pelletized thermoplastic polyimide resin (Tg 250° C., m.p. 388° C., melt viscosity 2500 poises as measured with KOUKA flow tester at 420° C.) was added 8% by weight of kitchen black EC (conductive furnace carbon black, one of conductive carbons), and the mixture was pelletized with a double-screw extruder, followed by drying as in Example 1.

The resulting pellets were put in the hopper of an extruder with constant purging with nitrogen gas, fed to the extruder having the same internally lined cylinder as described in Example 1 and melt-extruded. A 200-mesh screen pad was interposed between the cylinder tip and the die. As the die, an annular die having a slit width of 1 mm (outer diameter 32 mm, inner diameter 30 mm) and preheated at 390° C. was used. The extruded film was then cooled with an internal cooling type inside mandrel having an outer diameter of 24.5 mm to give a tubular film with a film thickness of 50±5 $\mu$ and a circumferential length of 76.5±0.5 mm.

This electrically conductive tubular film had a surface electric resistivity of $10^6 \Omega/\square$ (ohm/square unit) and a very satisfactory surface precision.

Furthermore, the above film was excellent in dimensional accuracy, inclusive of film thickness, with a thickness error of ±5 $\mu$ and a circumferential length error of ±0.5 mm.

Comparative Example

An attempt was made to melt-extrude a thermosetting polyimide resin in the same manner as Example 1 but the very melt-extrusion was unfeasible.

Thus, the tubular thermoplastic polyimide film of the invention is excellent particularly in dimensional accuracy, inclusive of film thickness, and is very suitable for use in a variety of applications such as flexible printed circuit (FPC) substrates, wire insulating films, electrical and electronic parts requiring heat resistance, such as copier and printer belts (e.g. fixation belts), as well as precision machine driving belts where the excellent dimensional accuracy of the film of the invention is expected to be highly valued. The tubular film of the invention is further expected to find application in food, medical, optical and other industries.

We claim:

1. A tubular thermoplastic film consisting essentially of polyimide made by extruding a thermoplastic polyimide resin to form a tubular film and drawing the tubular film formed by extrusion at a draw ratio of 1.1/1 to 3/1 in the circumferential and in the longitudinal directions.

2. A tubular film according to claim 1, wherein the thermoplastic polyimide resin contains an inorganic filler.

3. A tubular film according to claim 1, wherein the thermoplastic polyimide resin being extruded has a water content of not more than 30 ppm.

4. A tubular film according to claim 1, wherein the thermoplastic polyimide resin has a melt viscosity of 1000 to 4000 poises as measured at 380°–420° C.

* * * * *